United States Patent [19]
Szatmary

[11] Patent Number: 5,287,881
[45] Date of Patent: Feb. 22, 1994

[54] SEALED BONNET FOR ACTUATING A QUARTER TURN VALVE ASSEMBLY

[76] Inventor: Michael A. Szatmary, 8925 Admirals Pointe Dr., Indianapolis, Ind. 46236

[21] Appl. No.: 77,124

[22] Filed: Jun. 14, 1993

Related U.S. Application Data

[62] Division of Ser. No. 718,343, Jun. 19, 1991, Pat. No. 5,246,029.

[51] Int. Cl.$^5$ .................... F16K 41/04; F16K 31/54; F16K 51/00
[52] U.S. Cl. .................... 137/312; 74/18.2; 74/89.17; 251/214; 251/229; 251/250; 251/335.3
[58] Field of Search .................... 74/18.2, 89.17, 109, 74/422; 137/312; 251/58, 214, 229, 250, 335.3

[56] References Cited

U.S. PATENT DOCUMENTS

| | | | |
|---|---|---|---|
| 1,264,282 | 4/1918 | Dearing | 251/250 |
| 2,520,430 | 8/1950 | Pearson | 251/335.3 |
| 2,642,890 | 6/1953 | Skewis | 251/335.3 |
| 2,708,563 | 5/1955 | Backman et al. | 251/335.3 |
| 2,910,266 | 10/1959 | Condello et al. | 251/58 |
| 2,963,260 | 12/1960 | Siravo | 251/250 |
| 2,983,479 | 5/1961 | Thomas | 251/250 |
| 3,104,862 | 9/1963 | Pearson et al. | 251/58 |
| 3,108,780 | 10/1963 | Wishart | 251/335.3 |
| 3,195,418 | 7/1965 | Zukas | 251/335.3 |
| 3,218,024 | 11/1965 | Kroekel | 251/250 |
| 3,239,191 | 3/1966 | Widera | 251/214 |
| 3,650,506 | 3/1972 | Bruton | 251/58 |
| 3,737,142 | 6/1973 | Boswell et al. | 251/58 |
| 4,046,350 | 9/1977 | Massey et al. | 251/58 |
| 4,087,074 | 5/1978 | Massey et al. | 251/58 |
| 4,201,366 | 5/1980 | Danko et al. | 251/335.3 |
| 4,260,128 | 4/1981 | Tito | 251/250 |
| 4,348,005 | 9/1982 | Eaton et al. | 251/335.3 |
| 4,452,426 | 6/1984 | Owoc | 251/335.3 |
| 4,468,002 | 8/1984 | Tremblay | 251/335.3 |
| 4,516,754 | 5/1985 | Owoc | 251/335.3 |
| 4,546,662 | 10/1985 | Tremblay | 251/335.3 |
| 4,580,763 | 4/1986 | Velan | 251/315 |
| 4,597,556 | 7/1986 | Sandling | 251/58 |
| 4,759,386 | 7/1988 | Grouw, III | 251/250 |
| 4,867,414 | 9/1989 | Hubacek | 251/315 |
| 4,955,245 | 9/1990 | Janssen et al. | 74/89.17 |
| 4,955,581 | 9/1990 | Dukas, Jr. | 251/214 |
| 4,976,403 | 12/1990 | Bramblet | 251/214 |

FOREIGN PATENT DOCUMENTS

| | | |
|---|---|---|
| 662256 | 4/1963 | Canada . |
| 0071750 | 2/1983 | European Pat. Off. . |
| 1501936 | 2/1978 | United Kingdom . |
| 2041172 | 9/1980 | United Kingdom . |
| 2046373 | 11/1980 | United Kingdom . |

OTHER PUBLICATIONS

"Bellowseal ® quarter turn valve", XOMOX literature, copyrighted 1990, five pages.

Primary Examiner—George L. Walton
Attorney, Agent, or Firm—Barnes & Thornburg

[57] ABSTRACT

A bonnet is provided for operating a quarter turn valve assembly. The valve assembly includes a valve housing formed to include a fluid-conducting passage therein and a quarter turn valve moveable in the passage to regulate flow of fluid through the passage. The bonnet comprises a mechanism for moving the quarter turn valve in the passage, the moving mechanism including an elongated linkage assembly. The bonnet further includes an actuator housing containing the moving mechanism and an adapter block interposed between the valve housing and the actuator housing and configured to provide a mechanism for connecting the actuator housing to the valve housing. The adapter block includes a recess formed therein including a mechanism for receiving the elongated linkage assembly. The bonnet further includes a mechanism for coupling the actuator housing to the valve housing to trap the adapter block therebetween so that the actuator housing, adapter block, and valve housing are held together as a unit. The bonnet also includes a first seal mechanism contained in the recess for establishing a first sealed connection between the elongated linkage assembly and the adapter block to block flow of any fluid in the valve housing into the actuator housing so that removal of the actuator housing allows for maintenance of the first seal mechanism within the recess while leaving the valve housing in place.

44 Claims, 5 Drawing Sheets

SEALED BONNET FOR ACTUATING A QUARTER TURN VALVE ASSEMBLY

This is a divisional application of U.S. patent application Ser. No. 07/718,343 filed Jun. 19, 1991, U.S. Pat. No. 5,246,029.

BACKGROUND AND SUMMARY OF THE INVENTION

This invention relates to valve actuators, and particularly to a bonnet for opening and closing a quarter turn valve assembly. More particularly, this invention relates to a bonnet configured to operate a quarter turn ball valve assembly and sealed to block escape of fluid from the valve assembly through the bonnet.

Quarter turn valves are commonly used to regulate or throttle the flow of a broad range of fluids in various industrial applications. In some applications, it is necessary to regulate the flow of a noxious liquid, gas, mixture, or other fluid conveyed from one point to another through a pipe or other conduit. A quarter turn valve assembly is mounted in a pipe and operable to regulate the flow of fluid through the pipe. Typically, the quarter turn valve assembly includes a valve housing that is welded to the pipe although it is known to use flanged or threaded joints to connect a quarter turn valve housing to a pipe.

Many different types of quarter turn valves are known. For example, ball valves, butterfly valves, and plug valves, etc. can be configured to function as a quarter turn valve. A quarter turn ball valve assembly includes a valve housing mounted in the pipe and a ball valve mounted in the housing such that it can be rotated "one quarter turn" inside the valve housing to move between its opened and closed position.

A bonnet is an apparatus that is coupled to a quarter turn valve assembly and operated to open and close a quarter turn valve included in the assembly. Typically, the bonnet is connected to a quarter turn valve mounted inside a housing and operable to rotate the quarter turn valve in a clockwise or counterclockwise direction inside the valve housing between a fluid flow-permitting "opened" position and a fluid flow-blocking "closed" position.

Bonnets of the type described above are well known in the art. For example, apparatus including a rack and pinion assembly for operating a rotary valve are disclosed in U.S. Pat. Nos. 4,597,556 to Sandling; 4,976,403 to Bramblet; 3,650,506 to Bruton; 2,983,479 to Thomas; and 1,264,282 to Dearing. Other apparatus for operating rotary valves are disclosed, for example, in U.S. Pat. Nos. 4,867,414 to Hubacek; 4,580,763 to Velan; 4,546,662 to Tremblay; 4,516,754 to Owoc; 4,468,002 to Tremblay; and 4,452,426 to Owoc.

A bonnet configured easily to mount on and detach from most types of quarter turn valve assemblies that are in service in a pipe line and in need of repair would advantageously avoid shortcomings of conventional bonnets. During development of the present invention, it has been observed that many conventional bonnets are designed to connect to only one brand of quarter turn valve assembly. This restriction makes it necessary for service personnel to maintain a supply of many different bonnet styles so that the right bonnet style for each quarter turn valve assembly in service will be available if bonnet repair or replacement becomes necessary. Maintaining a large inventory of different bonnet styles is both costly and troublesome. A single bonnet that is adaptable to mate with and actuate many different brands and styles of quarter turn valve assemblies would be an improvement over conventional bonnets.

It is difficult to retrofit an existing quarter turn valve with a replacement bonnet because conventional bonnets typically cannot be easily removed from the quarter turn valve to permit installation of a replacement bonnet. In some cases, the bonnet is formed to be an integral part of the quarter turn valve assembly and is not easily detached from the quarter turn valve assembly. It will be understood that many quarter turn valves assemblies are welded in place and that it is necessary to use a torch to cut the quarter turn valve assembly out of the pipe line so that a replacement bonnet can be attached to the old quarter turn valve assembly or a new bonnet and quarter turn valve unit can be inserted into the pipe line.

The pipe line can be disabled or otherwise out of service for a long time if it is necessary to cut a quarter turn valve assembly out of the pipe line each time the bonnet needs to be repaired or replaced. Typically, if flammable solvents or fluids are piped through the line, then the entire pipe line system must be shut down in the vicinity of the quarter turn valve assembly and the line must be purged of all fluid prior to commencement of any cutting or welding. In some cases, service personnel must obtain a repair permit to remove an old quarter turn valve assembly and weld a new or reconditioned quarter turn valve assembly and bonnet in place in the line.

It will be appreciated by those skilled in the art that removal and replacement of a quarter turn valve assembly held in place in a pipe line by flanged or threaded connections is still cumbersome and time-consuming. It is still necessary to shut down the line and provide enough skilled service technicians to handle the job.

A bonnet made of modular components that could be quickly and easily removed from a quarter turn valve assembly while leaving the quarter turn valve assembly in place in the pipe line would be an improvement over conventional bonnets. Moreover, a modular bonnet could be disassembled more easily after the bonnet is removed from the quarter turn valve assembly to enhance repair or rehabilitation of the bonnet.

The maximum amount of fluid that can pass through a bonnet from a quarter turn valve assembly to the atmosphere is prescribed by environmental specification, regulation, or law to minimize discharge of noxious fluid through a bonnet to the surroundings. While many conventional bonnets are hermetically sealed to comply with stringent environmental regulations, failure of a single sealed connection within many conventional bonnets could result in unwanted discharge of noxious fluids into the environment. A bonnet formed to include a series of sealed chambers or secondary seals therein to retain or trap noxious fluids in the bonnet should one of the primary sealed connections in the bonnet fail would be an improvement over conventional bonnets.

An improved bonnet is provided by the present invention for operating a quarter turn valve assembly. The quarter turn valve assembly includes a valve housing and a quarter turn valve movable in a fluid-conducting passage to control the flow of fluid through the passage. The valve housing is mounted in a pipe line so that the fluid-conducting passage becomes a part of the pipe line and the quarter turn valve is operable by means of the bonnet to regulate or throttle fluid flow through the pipe line.

According to the present invention, the bonnet includes means for moving the quarter turn valve in the passage formed in the valve housing between a passage-opening and a passage-closing position to regulate fluid flow through a pipe line connected to the passage. The bonnet further includes an actuator housing spaced apart from the valve housing and configured to contain the moving means. The moving means includes a linkage assembly that extends out of the actuator housing and into the spaced-apart valve housing to connect to the quarter turn valve.

A separate adapter block is included in the bonnet and interposed between the actuator housing and the valve housing. The adapter block includes means for supporting the portion of the linkage assembly that extends through the adapter block to reach the valve housing for movement relative to the adapter block.

The quarter turn valve will move in the valve housing to open and close the fluid-conducting passage upon actuation of the moving means in the actuator housing to move the linkage assembly (and the quarter turn valve connected thereto) relative to the adapter block.

Means is also provided for coupling the actuator housing to the valve housing to trap the adapter block therebetween. This causes the actuator housing, adapter block, and valve housing to be held together as a modular unit.

Advantageously, the adapter block can be configured to connect a single actuator housing to a great many styles and shapes of valve housings to reduce inventory of replacement bonnets. This feature enables service personnel to adapt a bonnet to mount on a particular quarter turn valve assembly merely by selecting the proper mating adapter block. It would only be necessary to keep an inventory of inexpensive adapter blocks to permit quick and easy reconfiguration of the improved bonnet of the present invention rather than maintaining a large, diverse stock of conventional bonnets. Further, a modular bonnet can be disassembled quickly and easily to permit efficient repair or rehabilitation of the bonnet including replacement of the various linkages, drive mechanisms, seals, or other components contained in the bonnet.

Moreover, a modular bonnet in accordance with the present invention can be removed from the valve housing containing the quarter turn valve without making it necessary for service personnel to remove the quarter turn valve assembly from its place in the pipe line. Essentially, the quarter turn valve can be moved to close the fluid-conducting passage, the existing bonnet can be removed while the quarter turn valve assembly housing remains attached to the pipe, and a new or rehabilitated bonnet in accordance with the present invention can be mounted on the valve housing.

In preferred embodiments of the present invention, the bonnet can also include a pair of sealing rings mounted on the portion of the linkage assembly that extends through the adapter block. These sealing rings are spaced apart to define a first sealed containment area inside the adapter block to retain and trap therein any fluid that might inadvertently leak from the valve housing into the adapter block. The sealing rings are loaded using a spring force with a predetermined force to extend their useful life as sealing members.

Also, two other sealed containment areas are provided in sequence inside the actuator housing to trap and retain therein any fluid that might inadvertently leak from the adapter block into the actuator housing. The last (or third) of these sealed containment areas is sealed by means of a bellows and at least one O-ring seal. A monitor is coupled to the third sealed containment area and calibrated to indicate if any unwanted fluid inadvertently leaks into the third sealed containment area from the second sealed containment area. Such a leak will only occur in the unlikely event that one or more seals in the first and second sealed containment areas fail.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
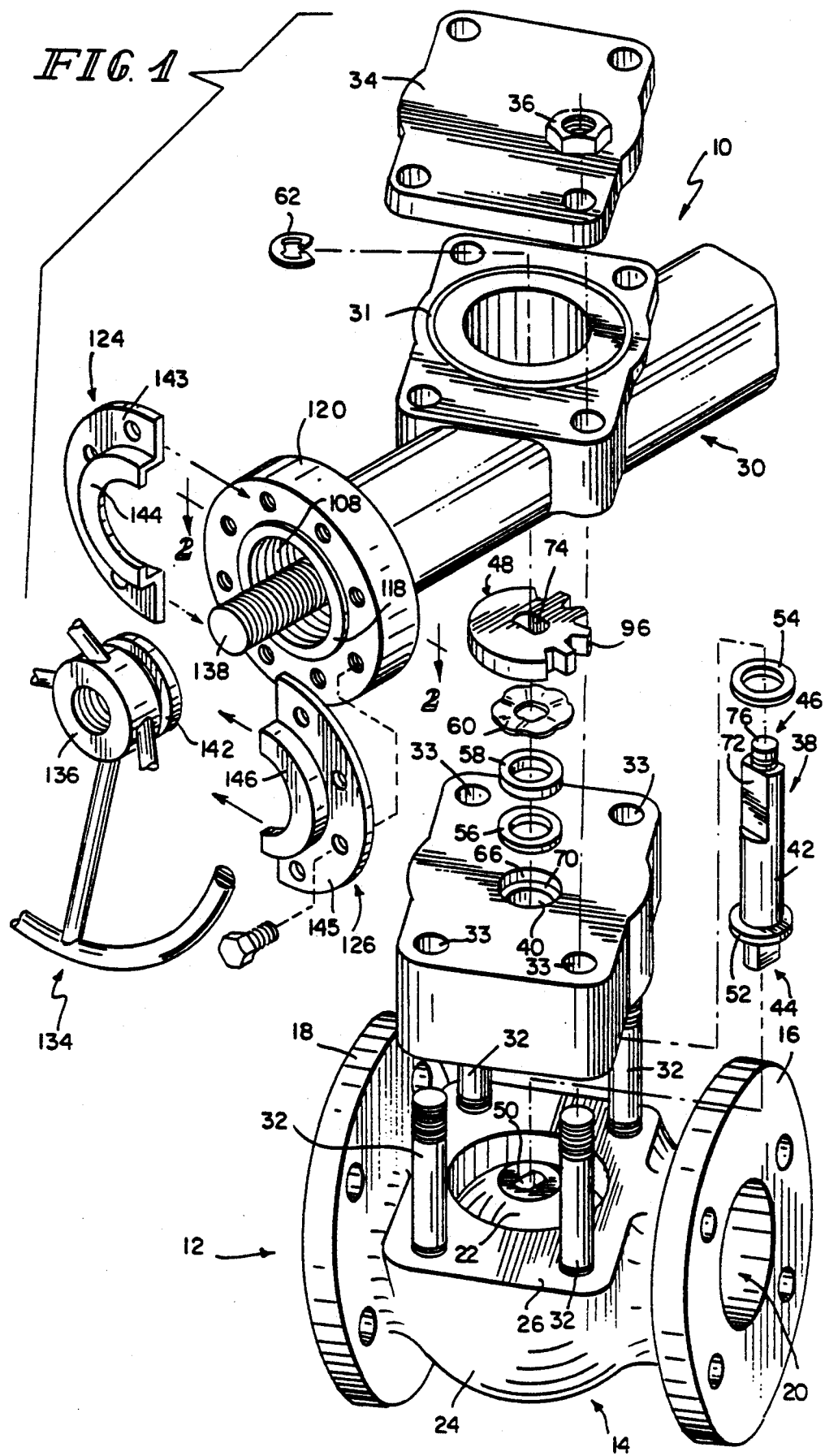
FIG. 1 is an exploded assembly view of a modular bonnet including an actuator housing and an adapter block in accordance with the present invention before the bonnet is assembled and mounted on a valve housing containing a quarter turn valve.
Figure 2:
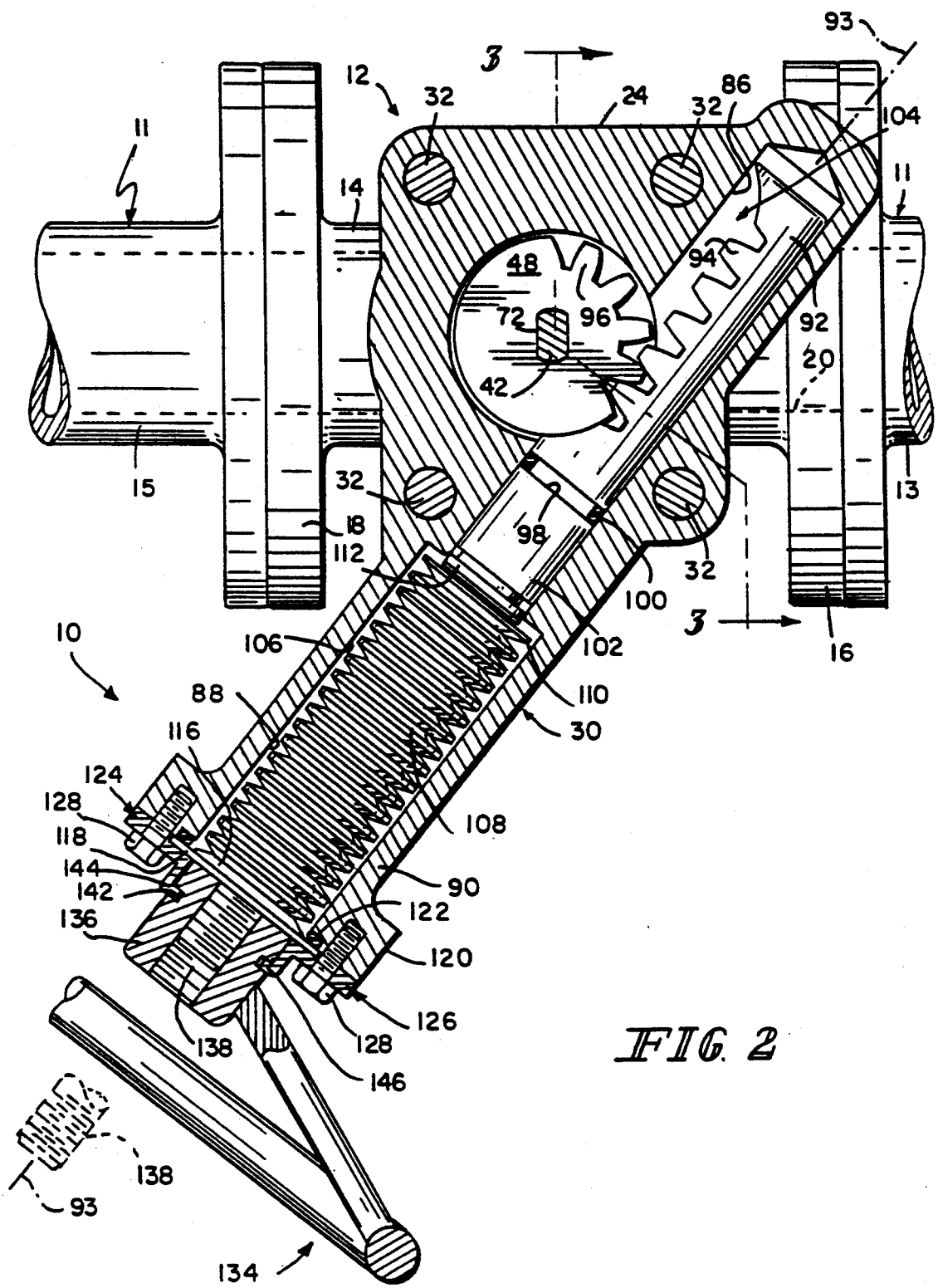
FIG. 2 is a horizontal sectional view taken along lines 2—2 of FIG. 1 showing a rack and pinion assembly in the second sealed containment area in the actuator housing, a bellows in the third sealed containment area in the actuator housing, and a hand wheel for operating the rack and pinion assembly.

Referring to FIGS. 1 and 2, a bonnet 10 is provided for operating a quarter turn valve assembly 12 to control the flow of fluid (not shown) through a pipe 11 that is connected to the valve assembly 12. Valve assembly 12 includes a valve housing 14 and a pair of flanges 16, 18 for coupling the valve housing 14 to a pipe 11. The valve housing 14 is formed to include a passageway 20 extending therethrough to couple the pipe section 13 attached to flange 16 to the pipe section 15 attached to flange 18 in fluid communication as shown best in FIG. 2.

A quarter turn ball valve 22 is mounted in a center portion 24 of the valve housing 14 to lie in the fluid-conducting passageway 20. Ball valve 22 includes a conduit 23 extending therethrough and a pivot post 25 engaging an aperture 27 formed in the bottom wall of center portion 24 shown in FIG. 3. The quarter turn ball valve 22 is able to rotate within the interior region of center portion 24 under the control of bonnet 10 due in part to the rotative bearing engagement between pivot post 25 and center portion 24.

Figure 3:
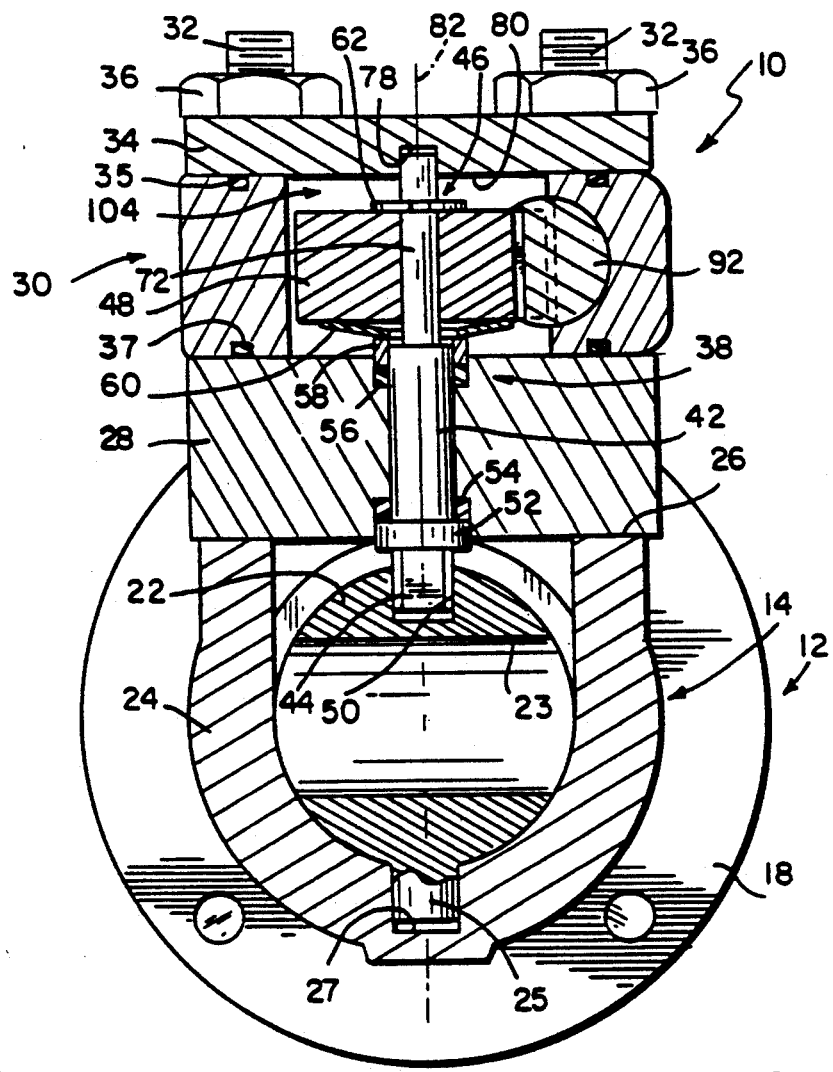
FIG. 3 is a sectional view taken along lines 3—3 of FIG. 2 showing the rack and pinion in the second sealed containment area in the actuator housing, a quarter turn ball valve in the valve housing, and a rotatable drive shaft interconnecting the pinion and the quarter turn ball valve and extending through the first sealed containment area formed in the adapter block.

The bonnet 10 is used in the manner described below to rotate the ball valve 22 (or any other quarter turn valve that might be mounted in valve housing 14 in lieu of ball valve 22) one quarter turn between a passageway-closing position (shown in FIG. 3) and a passageway-opening position (not shown). In its passageway-opening position, the ball valve 22 is positioned so that fluid conveyed through pipe section 13 can pass through conduit 23 to reach pipe section 15. In its passageway-closing position, the ball valve 22 is positioned inside valve housing 14 as shown in FIG. 3 so that fluid conveyed through pipe section 13 is blocked from entering conduit 23 and therefore cannot pass into the downstream pipe section 15.

The bonnet 10 is a modular apparatus that mounts easily to a mounting platform 26 provided on the center portion 24 of the valve housing 14. Conveniently, the adapter block 28 serves as one module while the actuator housing 30 serves as a second module. Bonnet 10 can be operated manually or automatically to open and close the quarter turn valve 22 mounted in the valve housing 14, thereby regulating the flow of fluid from the pipe (not shown) through the passageway 20 in the valve housing 14.

The bonnet 10 has an innovative modular design intended to simplify assembly and disassembly of the components in bonnet 10. As shown in FIG. 1, bonnet 10 includes an adapter block 28 for mounting on the mounting platform 26 provided on valve housing 12 and an actuator housing 30 for mounting on top of the adapter block 28. Bolts 32 extend through apertures 33 formed in adapter block 28 and are coupled at one end to the center portion 24 of valve housing 12 and at the other end to a lid 34 provided on actuator housing 30 using nuts 36 to hold the actuator housing 30, adapter block 28, and valve housing 12 together in a stack to form a modular unit as shown best in FIGS. 1 and 3. A pair of O-rings 35 and 37 are provided to establish a sealing connection between the adapter block 28 and the actuator housing 30 and the actuator housing 30 and its lid 34 as shown in FIG. 3. Preferably, the adapter block 28 and the actuator housing 30 are castings made of grade 316 stainless steel.

A drive linkage 38 is mounted in a central aperture 40 formed in the center of the adapter block 28 to provide means for rotating the ball valve 22 in the valve housing 14 between the passageway-opening and passageway-closing positions. Drive linkage 38 includes a drive shaft 42 having a bottom end 44 extending into the valve housing 12 to connect to the ball valve 22 and a top end 46 extending into the actuator housing 30 to connect to a pinion 48 provided therein. The bottom end 44 has a double D cross sectional shape to engage a matching aperture 50 formed in the top of ball valve 22 so that the ball valve 22 will rotate in response to rotation of the drive shaft 42 about is longitudinal axis in the central aperture 40 formed in the adapter block 28.

The drive linkage 38 also includes a fixed collar 52 integrally appended to the bottom end of the drive shaft, a first sealing ring 54, a second sealing ring 56, a movable collar 58, a wavy washer 60, and a snap ring 62. Illustratively, the drive shaft 42 is made of grade 316 stainless steel and machined to provide a shoulder thereon which functions as fixed collar 52. The first and second sealing rings 52, 54 are illustratively made of a hard TEFLON ® material. Also, a stainless steel bushing can be used to provide movable collar 58. As shown best in FIGS. 3 and 5, the adapter block 28 is formed to include a circular bottom cavity 64 sized to receive the fist sealing ring 54 and at least a portion of the fixed collar 52 therein and a circular top cavity 66 sized to receive the second sealing ring 56 and at least a portion of the movable collar 58 therein.

Although two sealing rings 54, 56 are included in the illustrated embodiment, it is contemplated that additional sealing rings may be included depending upon the sealing characteristics that are required. For example, in certain applications, it may be desirable to include either two or more first sealing rings 54 and/or two or more second sealing rings 56. Also, a bellville washer or other spring member could be used in place of wavy washer 60.

The drive linkage 38 can be coupled to the adapter block 28 and the pinion 48 in the following manner. The first sealing ring 54 is slid onto the drive shaft 42 over the top end 46 to rest on the fixed collar 52 formed on drive shaft 42. The top end 46 of the drive shaft 42 is then inserted up into the central aperture 40 in the adapter block 28 through the circular bottom cavity 64 and moved upwardly until the first sealing ring 54 rests against the bottom wall 68 of the circular bottom cavity 64. The first sealing ring 54 is now trapped between the fixed collar 52 and a portion 68 of the adapter block 28. Next, in sequence, the second sealing ring 56, movable collar 58, wavy washer 60, and pinion 48 are slid onto the drive shaft 42 over the top end 46 so that the second sealing ring 56 rests on the bottom wall 70 of the circular top cavity 66. The movable collar 58, wavy washer 60, and pinion 48 are stacked from bottom to top and aligned by the drive shaft 42 which extends upwardly through the stack.

As shown best in FIGS. 1–3, the top end 46 of drive shaft 42 includes a double-D section 72 for engaging a drive aperture 74 formed in the pinion 48 and a post section 76 for engaging a mounting aperture 78 formed in the underside 80 of the actuator housing lid 34. In operation, rotation of pinion 48 causes drive shaft 42 to rotate about its longitudinal axis 82 because of the driving engagement established between double-D section 72 on drive shaft 42 and pinion 48. During rotation of drive shaft 42, the post section 76 spins freely in the mounting aperture 78 formed in the underside 80 of lid 34 and serves to stabilize the drive linkage 38 axially and laterally.

Figure 5:
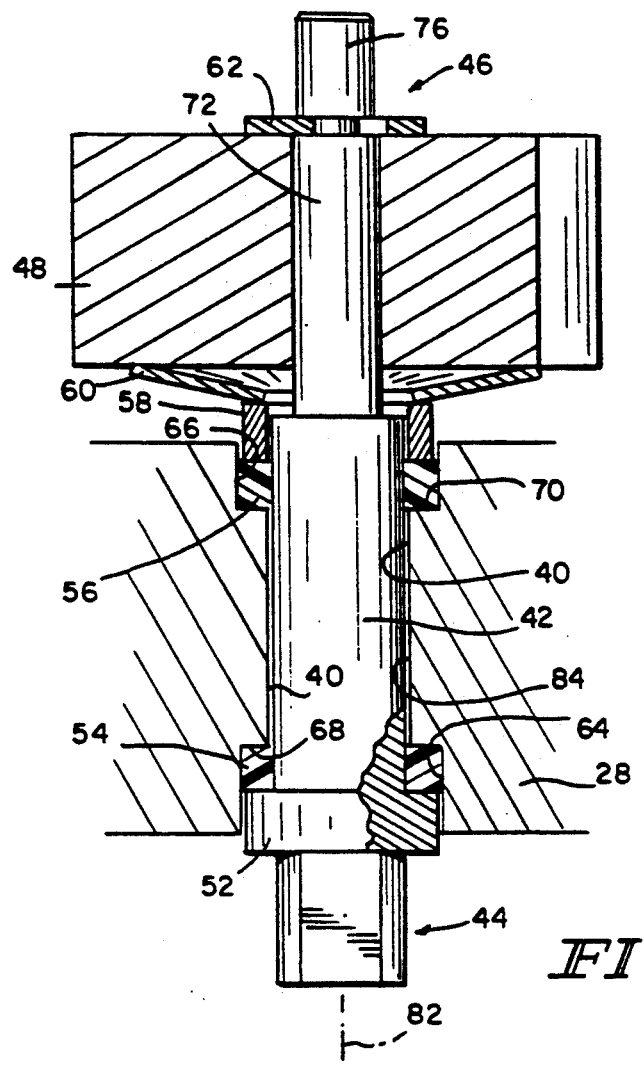
FIG. 5 is an enlarged view of the adapter block of FIG. 3 showing the manner in which a snap ring is used to urge the pinion against a wavy washer on the drive shaft to load the two sealing rings mounted on the drive shaft so that a first sealed containment area is established in the shaft-receiving passage formed in the adapter block.

To complete the pinion-shaft subassembly shown best in FIGS. 3 and 5, the pinion 48 is urged against the wavy washer 60 in a direction toward the adapter block 28 and then held in place axially on drive shaft 42 while a snap ring 62 is inserted above pinion 48 into a groove formed in the top end 46 of drive shaft 42 between double-D section 72 and post section 76. The pinion 48 is free to rotate about longitudinal axis 82 and, when rotated, causes the drive shaft 42 to rotate in the same direction about longitudinal axis 82.

In a current embodiment, about 50 pounds of force is applied to the pinion 48 to urge the wavy washer 60 toward adapter block 28 and permit connection of snap ring 62 to the top end 46 of drive shaft 42. This applied force causes the fixed collar 52 to urge the first sealing ring 54 into tight engagement with the bottom wall 68 of the circular bottom cavity 64 and the movable collar 58 to urge the second sealing ring 56 into tight sealing engagement with the bottom wall 70 of the circular top cavity 66. Thus, first sealing ring 54 establishes a first sealed connection between the adapter block 28 and the bottom end 44 of drive shaft 42 and second sealing ring 56 establishes a second sealed connection between adapter block 28 and the top end of drive shaft 42. Advantageously, such loading of sealing rings 54, 56 acts to extend or prolong the useful sealing life of those seals. The magnitude of force which should be applied to load the sealing rings 54, 56 is a function of the material and style of the sealing rings as well as the shape and spring characteristic of wavy washer 60.

Advantageously, the first and second sealing rings 54, 56 cooperate to define a first sealed containment area 84 inside the central aperture 40 formed in adapter block 28 to assist in retaining and trapping therein any fluid that might inadvertently leak from valve housing 12 into central aperture 40 upon a failure of the first sealing ring 54. The first sealed containment area 84 is shown diagrammatically in FIG. 6. The first sealed containment area 84 provides a first buffer zone to minimize the opportunity that fluids will inadvertently leak into the actuator housing 30.

Referring now to FIG. 2, the actuator housing 30 is formed to include an interior region providing a narrow diameter bore 86 in the space around pinion 48 and a larger diameter bore 88 in the outwardly extending, distal end 90 of the actuator housing 30. A means such as rack 92 is provided in the interior region formed by bores 86 and 88 for causing the pinion 48 to rotate in either a clockwise or counterclockwise direction. Of course, rotation of pinion 48 serves to rotate drive shaft 42 and the ball valve 22 which is connected to the bottom end 44 of drive shaft 42. It will be understood that linkages other than the rack 92 and pinion 48 could be installed in actuator housing 30 to control rotation of drive shaft 42 about longitudinal axis 82.

In the illustrated embodiment, a cylindrical member is configured to provide a rack 92 having teeth 94 for engaging the teeth 96 formed in pinion 48. Reciprocation of rack 92 in bore 86 causes the rack teeth 94 to mesh and engage the pinion teeth 96 to convert axial reciprocating movement of rack 92 along axis 93 into rotational movement of pinion 48 about axis 82.

The rack 92 is formed to include a circumferentially extending groove 98 as shown best in FIG. 2. This circumferential groove 98 is located midway along the body 102 of rack 92 so that it is arranged in close proximity to pinion 48 when rack 92 is fully inserted into the bore 86 formed in actuator housing 30. An O-ring seal 100 is mounted in the circumferential groove 98 to fit tightly against the cylindrical base 102 of rack 92. When the rack 92 is fully inserted into bore 86, the perimeter edge of O-ring seal 100 snugly fits against the inner wall of bore 86 to establish a snug, tight sealing engagement between rack 92 and actuator housing 30. In effect, O-ring seal 100 engages actuator housing 28 and rack 92 and second sealing ring 56 engages adapter block and drive shaft 42 so that seals 100 and 56 cooperate to define the end boundaries of a second sealed containment area 104 shown in part in FIGS. 2 and 3 and in full schematically in FIG. 6.

The second sealed containment area 104 provides a backup buffer zone to assist in retaining and trapping any fluid that might inadvertently leak past the seal established by the second sealing ring 56 from the central aperture 40 formed in adapter block 28 into the bore 86 formed in actuator housing 30. Advantageously, the second sealed containment area 104 helps to reduce the likelihood that fluids might leak from valve housing 12 into the atmosphere along a path through actuator housing 30. While O-ring seal 100 establishes a snug seal between rack 92 and actuator housing 30, it will be understood that O-ring seal 100 does not impair reciprocating movement of the cylindrical rack 92 along axis 93 inside the bore 86 formed in actuator housing 30. The rack 92 is illustratively made of grade 316 stainless steel.

Figure 6:
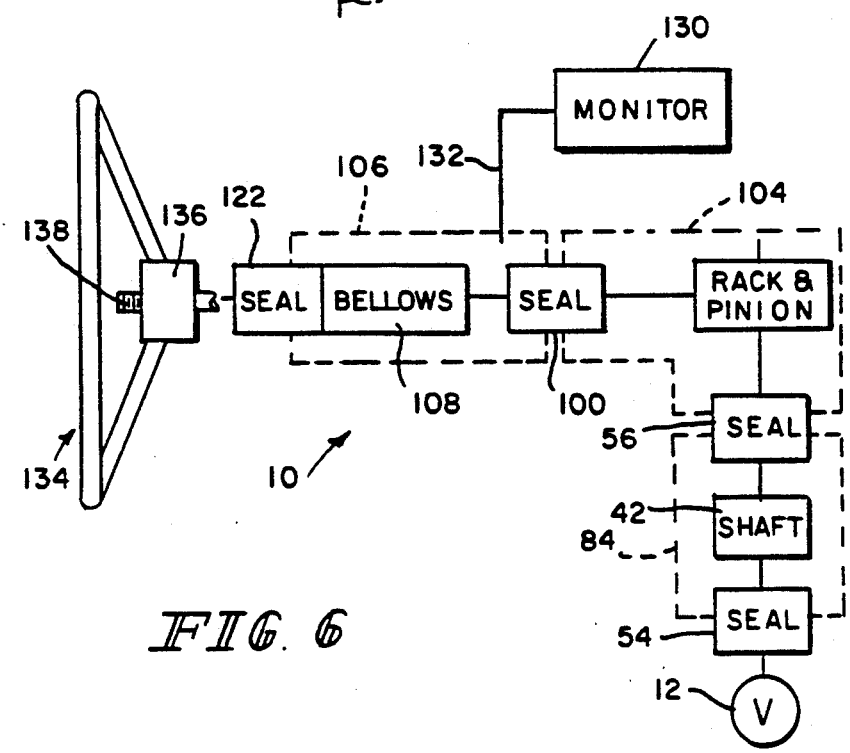
FIG. 6 is a schematic view of the bonnet of FIG. 1 illustrating the serial layout and arrangement of the three sealed containment areas provided in the bonnet to trap and retain any fluid that might inadvertently leak out of the valve housing and a monitor for detecting the presence of unwanted fluids in the third sealed containment area.

A third sealed containment area 106 is illustrated schematically in FIG. 6 to provide another backup buffer zone to assist in retaining and trapping in the larger diameter bore 88 formed in the outwardly extending distal end of actuator housing 30 any fluid that might inadvertently leak past the O-ring seal 100 provided in the narrow diameter bore 86. An expandable bellows 108 is situated in the larger diameter bore 88 and includes a front end 110 coupled to the rear end 112 of the cylindrical base 102 of rack 92 as shown best in FIGS. 2 and 4. Bellows 108 is illustratively made of grade 316L stainless-steel. One feature of bellows 108 is that it is configured to have a short length to large diameter ratio as shown in scale in FIG. 2 to limit lateral deflection of bellows 108 as it is reciprocated along axis 93.

Figure 4:
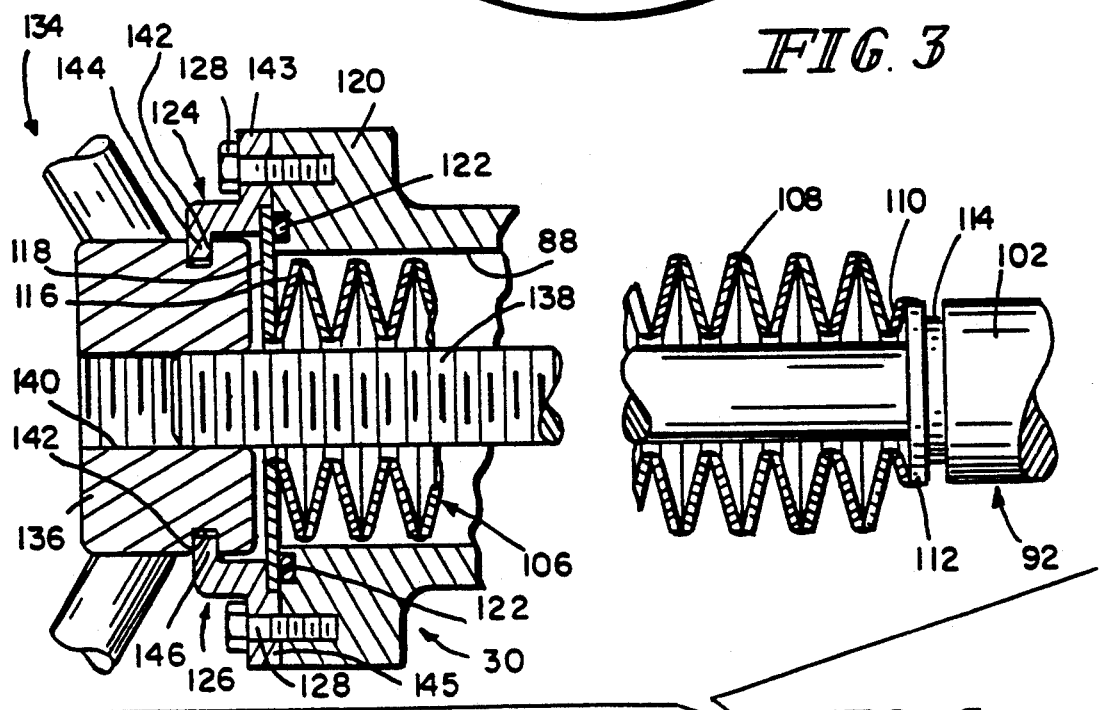
FIG. 4 is an enlarged view of a portion of the actuator housing of FIG. 2 showing the bellows in more detail.

A circumferentially extending groove 114 is formed near the end 112 of rack 92 to facilitate welding of bellows end 110 onto end 112 as shown best in FIG. 4. The bellows 108 also includes a rear end 116 coupled to a base ring 118. The base ring 118 is held against a mounting fixture 120 formed at the outermost end of the actuator housing 30. A circumferential groove is formed in mounting fixture 120 to receive an O-ring seal 122 as shown best in FIGS. 2 and 4. A pair of split end caps 124, 126 are attached to mounting fixture 120 using bolts 128 to urge the base ring 118 of bellows 108 against the O-ring seal 122 held in the groove formed in the outer end of mounting fixture 120 to establish a sealed connection therebetween. Of course, another sealed connection is established between the front end 110 of bellows 108 and the rear end 112 of rack 92. These two sealed connections cooperate with the previously described sealed connection established in bore 86 by O-ring seal 100 to define the third sealed containment area 106 inside a portion of narrow diameter bore 86 and all of the larger diameter bore 88.

As shown diagrammatically in FIG. 6, a monitor 130 is connected to the interior of the third sealed containment area 106 by conduit means 132. Monitor 130 operates to indicate whenever a predetermined contaminant fluid has entered into third sealed containment area 106. Typically, such contamination would occur only if there had been a failure of O-ring seal 100. By using the monitor, service personnel could determine whether it was necessary to remove and replace or rehabilitate certain components in bonnet 10. Of course, such repair or replacement becomes a very easy task because of the modular design of bonnet 10.

An operating handle 134 includes a central hub 136 that is coupled to a threaded axial rod 138 extending through bellows 108 to connect to rack 92. It will be understood that the threaded connection between hub 136 and rod 138 would permit an operator to rotate operating handle 134 about axis 93 to cause rod 138 to move axially within the central threaded aperture 140 formed in hub 136 and within bellows 108. Such axial movement of rod 138 will cause rack 92 to reciprocate back and forth inside the narrow diameter bore 86 formed in actuator housing 30 between the solid line and dotted line positions shown in FIG. 2 depending upon whether the operating handle 134 is rotated in a clockwise or counterclockwise direction. The split end caps 124 and 126 include C-shaped plates 143, 145 and C-shaped collars or flanges 144, 146 that engage in a circumferentially extending groove 142 formed in hub 136 as shown best in FIGS. 2 and 4. Such engagement maintains hub 136 in a rotatable condition relative to mounting fixture 120 without restricting or hampering axial movement of rod 138 inside the threaded central aperture 140 formed in hub 136.

Figure 7:
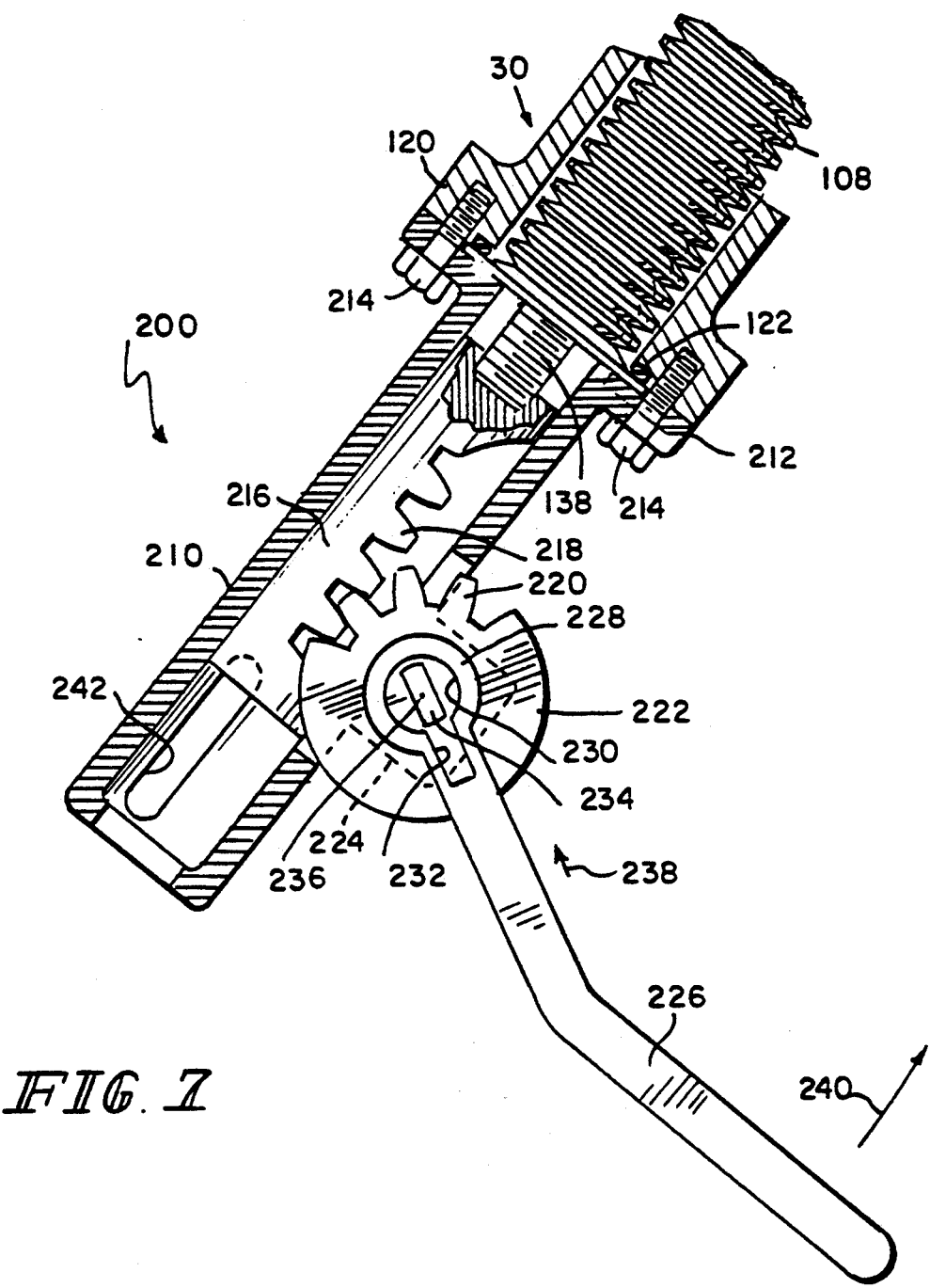
FIG. 7 is a view similar to FIG. 2 showing an alternative embodiment of an actuator for reciprocating the rack in the actuator housing.

Another embodiment of a rack-actuating means in shown in FIG. 7. This rack-actuating means 200 is adaptable to be mounted on the actuator housing 30 in lieu of the rotatable handle 134 and split collar assembly shown in the embodiment of FIG. 1. In some applications, it preferable to provide a rotatable handle to control reciprocation of a rack or other linkage inside actuator housing 30. A rotating handle provides the service operator with a great deal of control in determining exactly how much axial movement of the rack will be permitted.

It will be understood, that other applications call for a handle that is connected through a linkage to operate a quarter turn valve and wherein the handle is rotated through one quarter turn to cause the quarter turn valve to move through one quarter turn between a passageway-opening and a passageway-closing position. The advantage of such a quarter turn operating handle is that a service person can easily control the degree of rotation of the quarter turn valve mounted inside the valve housing by observing the angle through which the quarter turn handle has been rotated.

Referring to FIG. 7, rack-actuating means 200 includes an elongated housing 210 formed to include a flange 212 at one end. Flange 212 is attached to mounting fixture 120 provided on actuator housing 30 by a plurality of bolts 214. The housing 210 has a hollow interior provided with a cylindrical shape to slidably receive therein a cylindrical rack 216. An inner end of the rack 216 is configured to threadably engage the threaded actuator rod 138 which is appended to the other rack or quarter valve-controlling linkage provided inside actuator housing 30. Rack 216 is formed to include a plurality of teeth 218 that mateably engage in mesh with teeth 220 formed on a pinion 222. Pinion 222 is mounted for rotation to a mounting bracket 224 appended to one side of housing 210.

In the illustrated embodiment, the construction of the rack-actuating means 200 is made simple by use of the same rack and pinion that is used inside actuator housing 30 to control rotation and actuation of drive shaft 42. This commonality of parts can reduce inventory and make the availability of a quarter turn handle such as quarter turn handle assembly 200 more available.

A quarter turn handle 226 is formed to include a hub 228 at one end as shown in FIG. 7. Hub 228 includes a circular aperture 230 and a drive slot 232 communicating with the circular aperture 230. A drive member 234 extends upwardly through pinion 222 to provide a means for attaching the pinion 222 to the handle 226 so that pivoting movement of the handle 226 will result in rotation of pinion 222.

Pivoting movement of handle 226 about axis 236 will not result in rotation of pinion 222 about axis 236 because the handle 226 is moved to disengage drive slot 232 from drive member 236. In the illustrated position, handle 226 can be moved or rotated about axis 236 to collapse drive handle to an inactive rest position (not shown) alongside actuator housing 30.

In the event, that a service technician desires to operate the bonnet, the operating handle can be rotated to the position shown in FIG. 7 and then moved in direction 238 to cause handle 226 to move relative to pinion 222 so that drive member 234 fits snugly inside drive slot 232. Then, rotation of operating handle 226 about axis 236 in direction 240 will impart rotational movement to pinion 222 and cause rack 216 to reciprocate inside housing 210 to control operation of the quarter turn valve provided in the valve housing coupled to actuator housing 30.

A slot 242 can be provided in the outermost end of housing 210 to enable a service person operating the handle 226 to determine the position of rack 216 inside the housing 210. This will provide a visual indication of the location of the rack 216 so that the service person can determine whether or not the quarter turn valve is in its passageway-opening or passageway-closing position.

Although the invention has been described in detail with reference to certain preferred embodiments and specific examples, variations and modifications exist within the scope and spirit of the invention as described and defined in the following claims.

What is claimed is:

1. A bonnet for operating a quarter turn valve assembly, which assembly includes a valve housing and quarter turn valve movable in a fluid-conducting passage provided in the valve housing to regulate flow of fluid through the passage, the bonnet comprising
   means for moving the quarter turn valve in the passage between a passage-opening position and a passage-closing position,
   a bonnet housing coupled to the quarter turn valve assembly and formed to include an interior region, the moving means extending through the bonnet housing into the valve housing to connect to the quarter turn valve,
   first means for defining a first sealed containment area inside the interior region of the bonnet housing to retain and trap therein any fluid that leaks from the valve housing into the interior region of the bonnet housing, a first portion of the moving means extending through the first sealed containment area to the quarter turn valve,
   second means for defining a second sealed containment area inside the interior region of the bonnet housing to retain and trap therein any fluid that leaks from the first sealed containment area into the bonnet housing, a second portion of the moving means extending through the second sealed containment area and into the first sealed containment area, and third means for defining a third sealed containment area inside the interior region of the bonnet housing to retain and trap therein any fluid that leaks from the second sealed containment area into the interior region of the bonnet housing outside of the first sealed containment area, a third portion of the moving means extending through the third sealed containment area and into the second sealed containment area.

2. The bonnet of claim 1, further comprising detection means for indicating the presence of a contaminant fluid in the third sealed containment area.

3. The bonnet of claim 1, further comprising detection means for providing an indication that a contaminant fluid has leaked from the second sealed containment area into the third sealed containment area.

4. The bonnet of claim 1, wherein the bonnet housing includes passage means for providing a passage extending between the second containment area and the valve housing, the moving means extends through said passage means to reach the quarter turn valve, the first means includes first seal means for establishing a first sealed connection in the passage means between the moving means and the bonnet housing and second seal means for establishing a second sealed connection in said passage means between the moving means and the bonnet housing, and the first seal means is situated in spaced-apart relation to the second seal means to define the first sealed containment area therebetween.

5. The bonnet of claim 4, wherein the moving means includes a rotatable drive shaft extending through said passage means and reaching into the valve housing to engage the quarter turn valve, a fixed collar is mounted on one end of the drive shaft, a first sealing ring is mounted on said one end of the drive shaft and supported thereon by the fixed collar, a movable collar is mounted on an opposite end of the drive shaft, a second sealing ring is mounted on said opposite end of the drive shaft, and the first means further includes means for yieldably loading the movable collar to urge the fixed collar and the first sealing ring against the bonnet housing to establish the first seal means and to urge the movable collar and the second sealing ring against the bonnet housing to establish the second seal means.

6. The bonnet of claim 1, wherein the third means includes a bellows having first and second ends and an exterior surface therebetween, the moving means includes a reciprocable drive rod extending through the first and second ends to reciprocate inside the bellows during movement of the quarter turn valve between its passage-opening position and its passage-closing position, and the third means further includes means for sealing the bellows and reciprocable drive rod to the bonnet housing to define the third sealed containment area between the exterior surface of the bellows and the bonnet housing.

7. The bonnet of claim 6, wherein the sealing means includes a first seal engaging the reciprocable drive rod and the bonnet housing.

8. The bonnet of claim 7, wherein the sealing means further includes a second seal engaging the bellows and the bonnet housing.

9. The bonnet of claim 8, wherein the second seal engages the first end of the bellows and the second end of the bellows is positioned to lie between the first and second seals.

10. The bonnet of claim 6, wherein the moving means further includes a rack and pinion assembly connected to the reciprocable drive rod and the rack and pinion assembly is situated in the second sealed containment area.

11. The bonnet of claim 10, wherein the moving means further includes a rotatable drive shaft interconnecting the rack and pinion assembly and the quarter turn valve and the rotatable drive shaft extends through the first sealed containment area.

12. The bonnet of claim 1, wherein the moving means further includes a rack and pinion assembly connected to the reciprocable drive rod and the rack and pinion assembly is situated in the second sealed containment area.

13. The bonnet of claim 12, wherein the moving means further includes a rotatable drive shaft interconnecting the rack and pinion assembly and the quarter turn valve and the rotatable drive shaft extends through the first sealed containment area.

14. The bonnet of claim 1, wherein the third means includes a bellows situated in the third sealed containment area to position the first and second sealed containment areas in series between the quarter turn valve and the bellows to increase the useful life of the bellows.

15. The bonnet of claim 14, wherein the moving means includes a reciprocable drive rod extending through the bellows and the third means further includes means for sealing the bellows and the reciprocable drive rod to the bonnet housing to define the third sealed containment area between the bellows, drive rod, and bonnet housing.

16. A bonnet for operating a quarter turn valve assembly, which assembly includes a valve housing, a quarter turn valve, the quarter turn valve being movable in a fluid-conducting passage provided in the valve housing to regulate flow of fluid through the passage, the bonnet comprising means for moving the quarter turn valve in the passage between a passage-opening position and a passage-closing position, a pinion coupled to the moving means, rack means for rotating the pinion to actuate the moving means so that the quarter turn valve is moved between its passage-opening position and its passage-closing position, drive means for reciprocating the rack means to rotate the pinion, a bonnet housing coupled to the valve housing of the quarter turn valve assembly and formed to include an interior region containing the moving means, pinion and rack means, the drive means being coupled to the rack means and positioned to lie outside of the bonnet housing, first means for defining a first sealed containment area solely inside the interior region of the bonnet housing to retain and trap therein any fluid that leaks from the quarter turn valve assembly into the interior region of the bonnet housing, the moving means being configured to extend through the first sealed containment area to interconnect the pinion and the quarter turn valve, second means for defining a second sealed containment area inside the interior region of the bonnet housing to retain and trap therein any fluid that leaks from the first sealed containment area into the remaining interior region of the bonnet housing, the pinion being positioned in the second sealed containment area, and third means for defining a third sealed containment area inside the interior region of the bonnet housing to retain and trap therein any fluid that leaks from the second sealed containment area into the remaining interior region of the bonnet housing outside the first sealed containment area, the rack means being configured to extend through the third sealed containment area to interconnect the drive means and the pinion.

17. The bonnet of claim 16, wherein the bonnet housing is formed to include a shaft-receiving passage extending between the quarter turn valve assembly and the second containment area, the moving means includes a drive shaft interconnecting the pinion and the quarter turn valve, and means for rotatably supporting the drive shaft in the shaft-receiving passage so that the drive shaft rotates with the pinion to move the quarter turnball valve in response to reciprocation of the rack means, the first means includes first seal means for establishing a first sealed connection in the shaft-receiving passage between the drive shaft and the bonnet housing without inhibiting rotation of the drive shaft in the shaft-receiving passageway and second seal means for establishing a second sealed connection in the shaft-receiving passage between the drive shaft and the bonnet housing without inhibiting rotation of the drive shaft in the shaft-receiving passage, and the first seal means is situated in spaced-apart relation to the second seal means in the shaft-receiving passage to define the first sealed containment area therebetween.

18. The bonnet of claim 17, wherein the drive shaft includes a first end coupled to the quarter turn valve and a second end coupled to the pinion, a fixed collar is appended to the first end, a first sealing ring is mounted on the drive shaft and supported thereon by the fixed collar, a second sealing ring is mounted on the second end of the drive shaft, a movable collar is mounted on the second end of the drive shaft to lie between the second sealing ring and the pinion, and the first means further includes means for yieldably loading the movable collar to urge the fixed collar and first sealing ring against the bonnet housing to establish the first seal means and to urge the movable collar and the second sealing ring against the bonnet housing to establish the second seal means.

19. The bonnet of claim 18, wherein the loading means includes a spring member mounted on the second end of the drive shaft and located between the movable collar and the pinion and means for locking the pinion to the second end of the drive shaft to apply a predetermined load urging the spring member in a direction toward the movable collar.

20. The bonnet of claim 19, wherein the spring member is a wavy washer.

21. The bonnet of claim 19, wherein the locking means is a snap ring.

22. The bonnet of claim 16, wherein the third means includes a bellows situated in the third sealed containment area to position the first and second sealed containment areas in series between the quarter turn valve and the bellows to increase the useful life of the bellows.

23. The bonnet of claim 22, wherein the third means further includes means for sealing the bellows and the rack means to the bonnet housing to define the third sealed containment area therebetween.

24. In a bonnet for operating a quarter turn valve assembly, the quarter turn valve assembly including a quarter turn valve movable in a fluid-conducting passage to regulate flow of fluid through the passage, the bonnet including a housing, a pinion supported for rotation in the housing, a rack supported for reciprocation in the housing to rotate the pinion, the improvement comprising a drive shaft interconnecting the pinion and the quarter turn valve, the drive shaft including a first end coupled to the quarter turn valve and a second end coupled to the pinion, means for rotatably supporting the drive shaft in a shaft-receiving passage formed in the housing so that the drive shaft rotates with the pinion to move the quarter turn valve in response to reciprocation of the rack, first seal means for establishing a first sealed connection in the shaft-receiving passage between the drive shaft and the housing, and second seal means for establishing a second sealed connection in the shaft-receiving passage between the drive shaft and the housing, the first seal means being situated in spaced-apart relation to the second seal means in the shaft-receiving passage to define a sealed containment area in the shaft-receiving passage to retain and trap therein any fluid that leaks from the quarter turn valve assembly into the housing, wherein a fixed collar is appended to the first end, a first sealing ring is mounted on the drive shaft and supported thereon by the fixed collar, a second sealing ring is mounted on the second end of the drive shaft, a movable collar is mounted on the second end of the drive shaft to lie between the second sealing ring and the pinion, and means is provided for yieldably loading the movable collar to urge the fixed collar and first sealing ring against the bonnet housing to establish the first seal means and to urge the movable collar and the second sealing ring against the bonnet housing to establish the second seal means, the loading means including a spring member mounted on the second end of the drive shaft and located between the movable collar and the pinion and means for locking the pinion to the second end of the drive shaft to apply a predetermined load urging the spring member in a direction toward the movable collar.

25. In a bonnet for operating a quarter turn valve assembly, the quarter turn valve assembly including a quarter turn valve movable in a fluid-conducting passage to regulate flow of fluid through the passage, the bonnet including a housing, a pinion supported for rotation in the housing, a rack supported for reciprocation in the housing and movable to rotate the pinion, the improvement comprising a drive shaft including a first end coupled to the quarter turn valve and a second end coupled to the pinion, and first seal means for establishing a first sealed connection between the drive shaft and the housing, the first seal means including a first seal mounted on the drive shaft and loading means acting between the pinion and the drive shaft for yieldably loading the first seal with a predetermined spring load to urge the first seal against the drive shaft and the housing to establish the first sealed connection, the loading means including a fixed collar appended to the first end of the drive shaft and positioned to engage the first seal, a spring member mounted on the second end of the drive shaft and positioned to lie between the housing and the pinion, and means for urging the pinion against the spring member so that the first seal is compressed between the fixed collar, the drive shaft, and the housing to establish the first sealed connection.

26. The improvement of claim 25, wherein the spring member is a wavy washer.

27. The improvement of claim 25, wherein the urging means is coupled to the second end of the drive shaft.

28. The improvement of claim 27, wherein the urging means is a snap ring.

29. In a bonnet for operating a quarter turn valve assembly, the quarter turn valve assembly including a quarter turn valve movable in a fluid-conducting passage to regulate flow of fluid through the passage, the bonnet including a housing, a pinion supported for rotation in the housing, a rack supported for reciprocation in the housing and movable to rotate the pinion, the improvement comprising a drive shaft including a first end coupled to the quarter turn valve and a second end coupled to the pinion, first seal means for establishing a first sealed connection between the drive shaft and the housing, the first seal means including a first seal mounted on the drive shaft and loading means acting between the pinion and the drive shaft for yieldably loading the first seal with a predetermined spring load to urge the first seal against the drive shaft and the housing to establish the first sealed connection, and second seal means for establishing a second sealed connection between the drive shaft and the housing, the second seal means including a second seal mounted on the drive shaft and the loading means acts between the pinion and the drive shaft to yieldably load the second seal with a predetermined spring load to urge the second seal against the drive shaft and the housing to establish the second sealed connection, the loading means including a movable collar mounted on the second end of the drive shaft and positioned to engage the second seal, a spring member mounted on the second end of the drive shaft and positioned to lie between the housing and the pinion, and means for urging the pinion against the spring member so that the second seal is compressed between the movable collar, the drive shaft, and the housing to establish the second sealed connection.

30. The improvement of claim 29, wherein the spring member is a wavy washer.

31. The improvement of claim 29, wherein the urging means is coupled to the second end of the drive shaft.

32. The improvement of claim 31, wherein the urging means is a snap ring.

33. In a bonnet for operating a quarter turn valve assembly, the quarter turn valve assembly including a quarter turn valve movable in a fluid-conducting passage to regulate flow of fluid through the passage, the bonnet including a housing, a pinion supported for rotation in the housing, a rack supported for reciprocation in the housing and movable to rotate the pinion, the improvement comprising a drive shaft including a first end coupled to the quarter turn valve and a second end coupled to the pinion, a fixed collar appended to the first end, a first sealing ring mounted on the drive shaft and supported thereon by the fixed collar, a second sealing ring mounted on the second end of the drive shaft, a movable collar mounted on the second end of the drive shaft and positioned to lie between the second sealing ring and the pinion, and means for yieldably loading the movable collar to urge the fixed collar and the first sealing ring against the housing to establish a first sealed connection between the housing and the drive shaft to block flow of any fluid in the quarter turn valve assembly into the housing and to urge the movable collar and the second sealing ring against the housing to establish a second sealed connection between the housing and the drive shaft to block further flow of any fluid leaking past the first sealed connection, the loading means including a spring member mounted on the second end of the shaft and positioned to lie between the movable collar and the pinion and means for urging the pinion against the spring member so that the first sealing ring is compressed between the fixed collar, the drive shaft, and the housing to define the first sealed connection and the second sealing ring is compressed between the movable collar, the drive shaft, and the housing to define the second sealed connection.

34. The improvement of claim 33, wherein the spring member is a wavy washer.

35. The improvement of claim 34, wherein the urging means is coupled to the second end of the drive shaft.

36. The improvement of claim 35, wherein the urging means is a snap ring.

37. A bonnet for operating a quarter turn valve assembly, which assembly includes a valve housing and quarter turn valve movable in a fluid-conducting passage provided in the valve housing to regulate flow of fluid through the passage, the bonnet comprising means for moving the quarter turn valve in the passage between a passage-opening position and a passage-closing position, a bonnet housing coupled to the valve housing of the quarter turn valve assembly and formed to include an interior region, the moving means extending through the bonnet housing into the valve housing to connect to the quarter turn valve, first means for defining a first sealed containment area solely inside the interior region of the bonnet housing to retain and trap therein any fluid that leaks from the valve housing into the interior region of the bonnet housing, the moving means extending through the first sealed containment area to reach the quarter turn valve, second means for defining a second sealed containment area inside the interior region of the bonnet housing to retain and trap therein any fluid that leaks from the first sealed containment area into the bonnet housing, the moving means extending through the second sealed containment area to reach the first sealed containment area.

38. The bonnet of claim 37, wherein the moving means includes a rack and pinion assembly and a rotatable drive shaft interconnecting the quarter turn valve and the rack and pinion assembly, the rotatable drive shaft passes through the first and second sealed containment areas to reach the quarter turn valve, and the rack and pinion assembly is situated in the second sealed containment area.

39. The bonnet of claim 38, wherein the bonnet housing includes passage means for providing a passage extending between the second containment area and the valve housing, the moving means extends through said passage means to reach the quarter turn valve, the first means includes first seal means for establishing a first sealed connection in the passage means between the moving means and the bonnet housing and second seal means for establishing a second sealed connection in said passage means between the moving means and the bonnet housing, and the first seal means is situated in spaced-apart relation to the second seal means to define the first sealed containment area therebetween.

40. The bonnet of claim 38, wherein the moving means includes a rotatable drive shaft extending through said passage means and reaching into the valve housing to engage the quarter turn valve, a fixed collar is mounted on one end of the drive shaft, a first sealing ring is mounted on said one end of the drive shaft and supported thereon by the fixed collar, a movable collar is mounted on an opposite end of the drive shaft, a second sealing ring is mounted on said opposite end of the drive shaft, and the first means further includes means for yieldably loading the movable collar to urge the fixed collar and the first sealing ring against the bonnet housing to establish the first seal means and to urge the movable collar and the second sealing ring against the bonnet housing to establish the second seal means.

41. A bonnet for operating a quarter turn valve assembly, which assembly includes a valve housing, a quarter turn valve, the quarter turn valve being movable in a fluid-conducting passage provided in the valve housing to regulate flow of fluid through the passage, the bonnet comprising
    means for moving the quarter turn valve in the passage between a passage-opening position and a passage-closing position,
    a pinion coupled to the moving means,
    rack means for rotating the pinion to actuate the moving means so that the quarter turn valve is moved between its passage-opening position and its passage-closing position,
    drive means for reciprocating the rack means to rotate the pinion,
    a bonnet housing coupled to the valve housing of the quarter turn valve assembly and formed to include an interior region containing the moving means, pinion and rack means, the drive means being coupled to the rack means and positioned to lie outside of the bonnet housing,
    first means for defining a first sealed containment area solely inside the interior region of the bonnet housing and in spaced-apart relation to the valve housing to retain and trap therein any fluid that leaks from the quarter turn valve assembly into the interior region of the bonnet housing, the moving means being configured to extend through the first sealed containment area to interconnect the pinion and the quarter turn valve, and
    second means for defining a second sealed containment area inside the interior region of the bonnet housing to retain and trap therein any fluid that leaks from the first sealed containment area into the remaining interior region of the bonnet housing, the pinion being positioned in the second sealed containment area.

42. The bonnet of claim 41, wherein the bonnet housing is formed to include a shaft-receiving passage extending between the quarter turn valve assembly and the second containment area, the moving means includes a drive shaft interconnecting the pinion and the quarter turn valve, and means for rotatably supporting the drive shaft in the shaft-receiving passage so that the drive shaft rotates with the pinion to move the quarter turnball valve in response to reciprocation of the rack means, the first means includes first seal means for establishing a first sealed connection in the shaft-receiving passage between the drive shaft and the bonnet housing without inhibiting rotation of the drive shaft in the shaft-receiving passageway and second seal means for establishing a second sealed connection in the shaft-receiving passage between the drive shaft and the bonnet housing without inhibiting rotation of the drive shaft in the shaft-receiving passage, and the first seal means is situated in spaced-apart relation to the second seal means in the shaft-receiving passage to define the first sealed containment area therebetween.

43. The bonnet of claim 42, wherein the drive shaft includes a first end coupled to the quarter turn valve and a second end coupled to the pinion, a fixed collar is appended to the first end, a first sealing ring is mounted on the drive shaft and supported thereon by the fixed collar, a second sealing ring is mounted on the second end of the drive shaft, a movable collar is mounted on the second end of the drive shaft to lie between the second sealing ring and the pinion, and the first means further includes means for yieldably loading the movable collar to urge the fixed collar and first sealing ring against the bonnet housing to establish the first seal means and to urge the movable collar and the second sealing ring against the bonnet housing to establish the second seal means.

44. The bonnet of claim 43, wherein the loading means includes a spring member mounted on the second end of the drive shaft and located between the movable collar and the pinion and means for locking the pinion to the second end of the drive shaft to apply a predetermined load urging the spring member in a direction toward the movable collar.

* * * * *